Oct. 9, 1962 W. SHOCKLEY 3,058,009

TRIGGER CIRCUIT SWITCHING FROM STABLE OPERATION IN THE NEGATIVE RESISTANCE REGION TO UNSTABLE OPERATION

Filed July 15, 1959 2 Sheets-Sheet 1

INVENTOR
WILLIAM SHOCKLEY
BY Flehr & Swain
ATTORNEYS

Oct. 9, 1962 W. SHOCKLEY 3,058,009

TRIGGER CIRCUIT SWITCHING FROM STABLE OPERATION IN THE NEGATIVE RESISTANCE REGION TO UNSTABLE OPERATION

Filed July 15, 1959 2 Sheets-Sheet 2

INVENTOR
WILLIAM SHOCKLEY

BY Flehr & Swain
ATTORNEYS

United States Patent Office 3,058,009
Patented Oct. 9, 1962

3,058,009

TRIGGER CIRCUIT SWITCHING FROM STABLE OPERATION IN THE NEGATIVE RESISTANCE REGION TO UNSTABLE OPERATION

William Shockley, 23466 Corta Via, Los Altos, Calif.

Filed July 15, 1959, Ser. No. 827,331
11 Claims. (Cl. 307—88.5)

This invention relates generally to a pulse generating or trigger circuit and more particularly to a pulse generating circuit employing devices exhibiting negative resistance.

In many switching applications only relatively small control signals are available. These control signals are not suitable for controlling associated switching devices or circuits. It is often desirable to amplify or otherwise form new switching signals of sufficient magnitude for driving associated switching devices.

It is a general object of the present invention to provide a circuit which generates pulses in response to small control signals.

It is another object of the present invention to provide a pulse generating circuit which includes negative resistance devices.

It is a further object of the present invention to provide a pulse generating circuit which employs a negative resistance element which is biased into a stable region together with means for causing the device to operate in its unstable region to form output pulses.

These and other objects of the invention will become more clearly apparent from the following description when taken in conjunction with the accompanying drawing.

Referring to the drawing.

Figure 2:
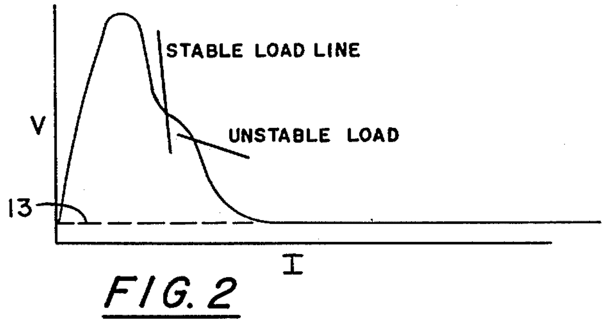
FIGURE 2 shows the voltage current characteristics of a typical negative resistance device.

FIGURE 2 shows the current-voltage characteristics of a suitable negative resistance device. The illustrated characteristics are for a four layer device of the type described in Patent No. 2,855,524. The stable load line for a resistive load is represented by the line S, while the unstable load line is represented by the letter U. The unstable load line is obtained by other types of loading. If the device is biased at the point of intersection of the load line U and the current-voltage characteristic curve, a slight disturbance in voltage will build up exponentially in an unstable manner.

Figure 1:
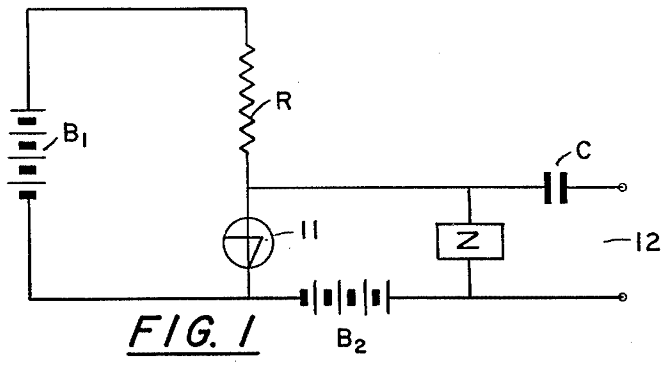
FIGURE 1 illustrates a circuit in accordance with the invention.

Referring to FIGURE 1, a four layer diode 11 is shown connected through a load resistance R to a power source $B_1$. An impedance Z connected in series with a second power source $B_2$ is connected in shunt with the device 11. A coupling capacitor C serves to couple the output terminal 12 to the device 11. Alternatively an output may be obtained across a low impedance fraction of R or a series resistance in series with Z.

Figure 3A:
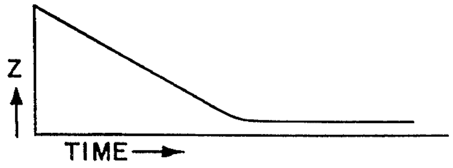
FIGURES 3A and 3B show operation of the circuit of FIGURE 1 in response to changes in impedance.
Figure 3B:
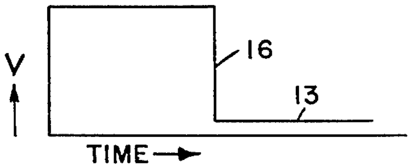

If the impedance Z is sufficiently high, it will not affect the load line of the device 11 and a stable condition as represented by the load line S, FIGURE 2, results. However, if the impedance Z is varied, it may alter the load line from the form S to the form U. When the impedance Z is sufficiently low, the current through the device 11 will increase and the voltage will drop to a voltage as indicated by the dotted line 13, FIGURE 2. This is illustrated in FIGURES 3A and 3B. As the impedance Z decreases, the device remains in its stable condition for a period of time until the impedance is lowered to a point where the device is unstable. The device suddenly draws a relatively large current and the voltage drops to the position shown by the line 13. Thus, a sharp voltage step 16 is generated in response to the small change in impedance.

Figure 4:
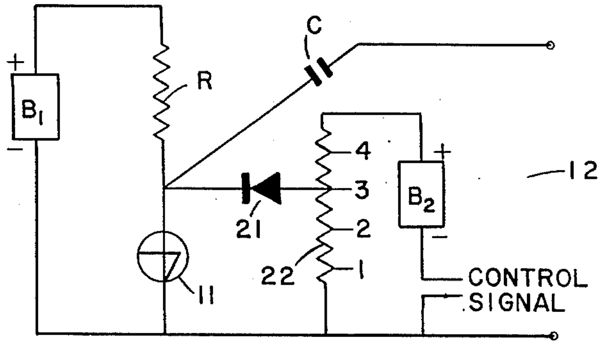
FIGURE 4 shows another pulse generating circuit in accordance with the invention.
Figure 5:
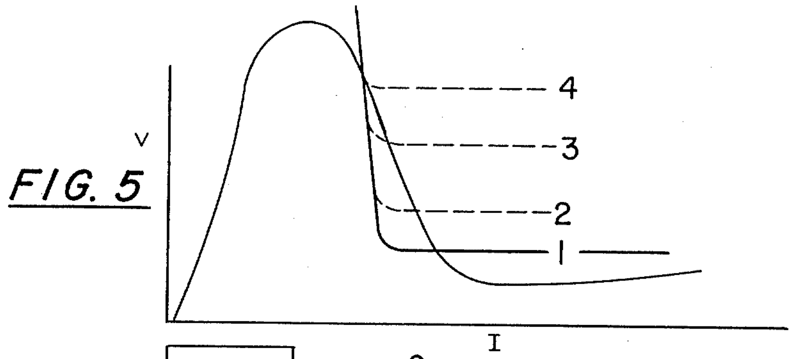
FIGURE 5 shows the operation of the circuit of FIGURE 4.

Referring to FIGURE 4, one means of accomplishing the change in impedance in response to a small control signal is illustrated. A conventional high impedance diode 21 is connected between the common terminal of the load resistor R and the device 11. The other end of the diode 21 is connected to the variable tap of the potentiometer 22 which is connected across a battery $B_2$. By varying the position of the tap from the positions indicated by numerals 1, 2, 3 and 4, the load lines shown in FIGURE 5 and designated 1, 2, 3 and 4 are obtained. When the potential at the common terminal is more positive than the potential at the tap, the diode 21 will draw negligible current, while on the other hand, when the potential at the tap is more positive than that at the common terminal, then the diode will draw relatively large currents. As the potential on the potentiometer is progressively raised, the load line represented by the impedance of the conventional diode plus potentiometer will vary as represented by the dotted lines in FIGURE 5. When the potential reaches a point $V_4$, the load line becomes tangent to the operating characteristics of the negative resistance device, and the device will increase its current exponentially along the line 4. That is, it switches to relatively high currents. By biasing the device to a voltage near the unstable point, a small signal applied at the control terminals will serve to switch the device and form an output pulse at the terminals 12.

The circuit of FIGURE 3 is illustrative and in actual practice might result in the destruction of the diode unless current limiting features are incorporated. This might arise from the finite resistance of the potentiometer whereby the intersection of large positive currents, load line, and the characteristics of the diode may occur in a non-destructive region.

Figure 6:
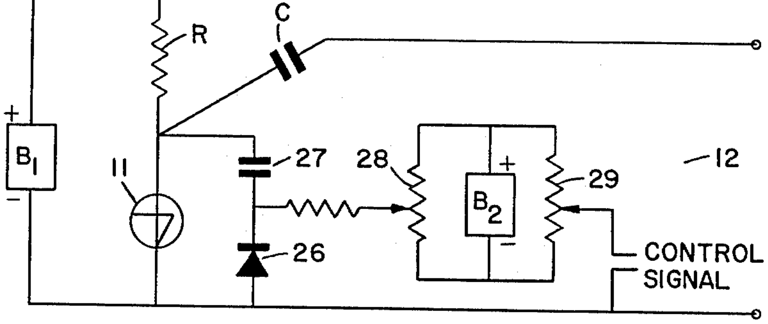
FIGURES 6–8 show other pulse generating circuits incorporating the invention.

FIGURE 6 illustrates another means of accomplishing the same purpose in a non-destructive fashion. In this case, the impedance Z is replaced by the diode 26 and capacitor 27 connected in series. A voltage source is shown for varying the voltage across the diode 26. The source comprises a pair of potentiometers 28 and 29 connected in parallel across the voltage source $B_2$ and having their taps connected to opposite ends of the diode 26 through the control signal terminals.

If the condenser is large enough, it will present a relatively low impedance for switching transients of the device 11. As the potential is varied across the conventional diode, its impedance will vary from very high values to very low values in the neighborhood of zero volt across the diode. When this occurs, the dynamic load line seen by the device 11 will shift from stable to unstable and the device 11 will build up its current rapidly to a high value and generate a sharp voltage front at the output terminals 12. It is evident that the potentiometer and battery may be replaced by any other voltage generator which initially has a negative voltage and changes to a slightly positive voltage.

The circuit of FIGURE 6 can be used to cause a small voltage signal to produce switching of the four layer diode from the voltage represented by the line S of FIGURE 2 to approximately the holding voltage. This voltage will be maintained while the condenser is discharged. After this, the process will repeat periodically, as long as the control signal is present, at a rate which depends upon the time constants associated with the resistors and capacitor C.

A circuit like FIGURE 6 is particularly suitable for generating a series of sharp voltage pulses from a small input signal. It should be noted that the D.C. level of the input signal can be established at any arbitrary value by providing a suitable bias source at one side of the conventional diode.

Figure 7:
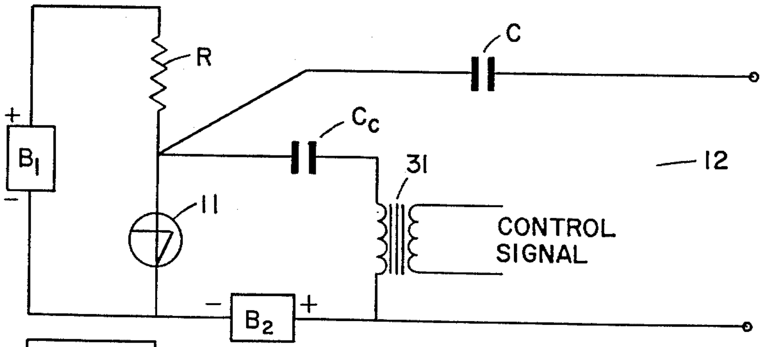

FIGURE 7 represents an alternative means for varying impedance. In this case, a saturable reactor 31 is represented which presents a high A.C. impedance and thus leads to a stable situation when no current flows in the control winding of the reactor. When current flows through the control winding, the saturable reactor may be made to saturate in such a direction that increasing current flow corresponding to turn-on of the four layer diode may occur at low impedances. By this means, the device 11, which may be a four layer diode, may be made to switch at a predetermined current level through the primary of the saturable core reactor.

Figure 8:
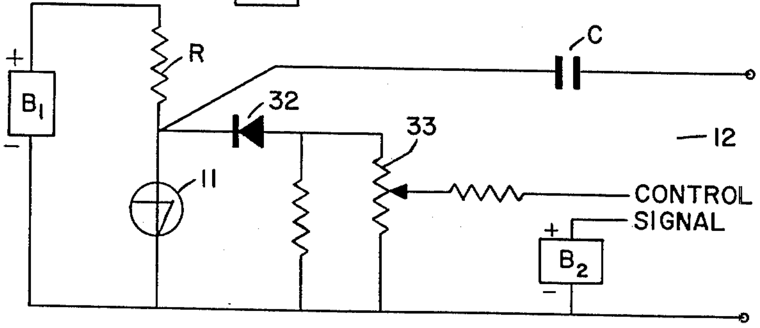

FIGURE 8 illustrates an alternative way of making a variable impedance. In this case, the variable impedance consists of a variable condenser. Variable capacity arises from the silicon p-n junction of the diode 32 whose capacity decreases with increasing reverse bias. In this case, the diode is reverse biased by the voltage across the four layer diode. Variations of the voltage applied to the diode 32 are achieved by the potentiometer 33. When the capacity of the diode rises to sufficiently high values, oscillations of the four layer diode will occur. These oscillations will lead to an increase in the capacity of the conventional diode and may even bring it to a condition of positive bias. If this occurs, the four layer diode will in effect encounter a load line which lies above its negative resistance characteristics and it will again switch to high currents.

It is evident that these principles apply to other current controlled negative resistance devices such as thermistors or gas diodes.

It is also evident that similar principles may be used for making sensitive devices using voltage controlled negative resistance devices such as the Eralsi or tunnel diode described in the Physical Review volume 109, 603, 1958. Such circuits may readily be derived using principle of duality as discussed by R. L. Wallace and G. Raisbeck Bell, Supt. Technical Institute, April 1951, volume 30, page 381–418.

Thus, it is seen that there is provided an improved circuit for generating switching pulses. The circuit generates sharp, relatively high power pulses in response to relatively small control signals.

I claim:

1. A trigger circuit comprising a negative resistance element, a fixed source of constant current potential supply which biases the negative resistance element stably in its negative resistance operating region, a variable impedance and a second source of potential serially connected between the terminals of the negative resistance element, and means for reducing the variable impedance so that the operating point changes from a stable to an unstable condition.

2. A trigger circuit as in claim 1 wherein the variable impedance is resistive.

3. A trigger circuit as in claim 1 wherein the variable impedance is capacitive.

4. A trigger circuit as in claim 3 wherein the variable impedance includes a p-n junction.

5. A trigger circuit as in claim 1 wherein the variable impedance is inductive.

6. A trigger circuit as in claim 5 wherein the variable impedance includes a saturable reactor.

7. A trigger circuit comprising a negative resistance element, a load, a first source of voltage serving to apply a voltage to said negative resistance element through said load, said load and voltage being selected whereby the element is biased to operate stably in its negative resistance region, and means responsive to a control signal for shifting the element from stable to unstable operation in its negative resistance region whereby the current through the element increases rapidly to a high value and the voltage across the element drops to a relatively low value.

8. A trigger circuit comprising a negative resistance element, a source of potential coupled to said negative resistive element, means coupled with said source of potential and said negative resistance element for pro viding a substantially constant minimum current to said negative resistance element from said source of potential whereby the negative resistance element is biased stably in its negative resistance region, variable impedance means connected to the negative resistance element, and means for reducing the variable impedance whereby the operating point of said negative resistance element changes from a stable to an unstable point.

9. A trigger circuit comprising a negative resistance element, impedance means, potential source means operatively coupled to said negative resistance element through said impedance means, said impedance means having a high impedance state and a low impedance state, said impedance means in conjunction with said potential source means being such that said negative resistance element is biased stably in its negative resistance operating region when the impedance means is in the high impedance state and said negative resistance element is operated unstably when said impedance means is in the low impedance state, and means for changing said impedance means from the high impedance to the low impedance state.

10. A trigger circuit comprising a negative resistance element, a first source of potential, first impedance means, said first source of potential being coupled to said negative resistance element through said first impedance means, said first impedance means in conjunction with said first source of potential being such that the load line therefor crosses the characteristic curve of said negative resistance element in the negative resistance region and at one point only, second impedance means, a second source of potential, said second source of potential being coupled to said negative resistance element through said second impedance means, said second impedance means being variable and having at least a high impedance state and a low impedance state, the high impedance state of said second impedance means in conjunction with said second source of potential being such that insignificant current is passed to the negative resistance element for said second source of potential when the second impedance means is in its high impedance state, the low impedance state of said second impedance means in conjunction with said second source of potential being such that the load line therefor crosses the characteristic curve of said negative resistance element at at least two points whereby operation of the negative resistance element is unstable, and means for change said second impedance element from its high impedance state to its low impedance state.

11. A trigger circuit comprising a negative resistance element, a first source of potential, impedance means, said first source of potential being coupled to said negative resistance element through said impedance means, said impedance means in conjunction with said first source of potential being such that the load line therefor crosses the characteristic curve of said negative resistance element in the negative resistance region and at one point only, a unidirectional current transmitting device, a second source of potential coupled to said negative resistance element through said unidirectional current transmitting device, the voltage of said second source of potential being less than the voltage at the intersection of the characteristic curve of the negative resistance element and the load line corresponding to the first impedance means and the first source of potential, the polarity of the connection of the unidirectional element being such that the unidirectional element is back biased by the difference in the voltage across the negative resistance element and that of second source of potential, whereby the unidirectional device presents a high impedance to the negative resistance element, and means for applying additional voltage to said second potential source whereby the unidirectional element becomes forward biased and presents a low impedance to the negative resistance element, said low impedance being such that the load line therefor crosses the characteristic curve of the negative resistance element at at least two points to cause unstable operation.

References Cited in the file of this patent

UNITED STATES PATENTS

| | | |
|---|---|---|
| 2,577,803 | Pfann | Dec. 11, 1951 |
| 2,581,273 | Miller | Jan. 1, 1952 |

| | | |
|---|---|---|
| 2,666,977 | Pfann | Jan. 26, 1954 |
| 2,740,940 | Becker et al. | Apr. 3, 1956 |
| 2,843,765 | Aigrain | July 15, 1958 |
| 2,909,659 | Woo | Oct. 20, 1959 |
| 2,912,599 | Abraham | Nov. 10, 1959 |

FOREIGN PATENTS

| | | |
|---|---|---|
| 166,800 | Australia | Feb. 6, 1956 |
| 217,799 | Australia | Apr. 30, 1956 |
| 1,058,550 | Germany | June 4, 1959 |

OTHER REFERENCES

"Germanium Crystal Diodes," by Cornelius, Electronics, February 1946, pages 118–123.

Negative Resistance in Germanium Diodes, by Kauke, Radio-Electronic Engineering, April 1953, pages 8–10.

"The Application of The Dynistor Diode to Off-On Controllers," by Pittman, I.R.E. Professional Group on Circuit Theory, Transistor and Solid State Circuit Conference, 1958, pages 55–56.